United States Patent [19]

St. Clair

[11] Patent Number: 5,459,200
[45] Date of Patent: Oct. 17, 1995

[54] POLYURETHANE COATINGS AND ADHESIVES CONTAINING MONOHYDROXYLATED DIENE POLYMERS AND EPOXIDIZED DERIVATIVES THEREOF

[75] Inventor: David J. St. Clair, Houston, Tex.

[73] Assignee: Shell Oil Company, Houston, Tex.

[21] Appl. No.: 320,802

[22] Filed: Oct. 11, 1994

[51] Int. Cl.$^6$ ............................................. C08F 8/30
[52] U.S. Cl. ........................... 525/131; 525/125; 525/127; 525/130
[58] Field of Search ...................... 525/125, 131, 525/127, 130

[56] References Cited

U.S. PATENT DOCUMENTS

| | | | |
|---|---|---|---|
| 4,237,245 | 12/1980 | Halasa et al. | 525/272 |
| 4,242,468 | 12/1980 | Baack et al. | 521/170 |
| 5,115,019 | 5/1992 | Marx et al. | 525/65 |
| 5,149,895 | 9/1992 | Coolbaugh et al. | 526/173 |
| 5,169,910 | 12/1992 | Corley | 525/481 |
| 5,191,024 | 3/1993 | Shibata et al. | 525/314 |
| 5,210,359 | 5/1993 | Coolbaugh et al. | 526/173 |
| 5,229,464 | 7/1993 | Erickson et al. | 525/314 |
| 5,247,026 | 9/1993 | Erickson et al. | 525/331.9 |
| 5,332,783 | 7/1994 | Dillman et al. | 525/92 |

FOREIGN PATENT DOCUMENTS

| | | | |
|---|---|---|---|
| 0396780A1 | 11/1989 | European Pat. Off. | C08F 297/04 |
| 0441485A2 | 1/1991 | European Pat. Off. | C08F 236/04 |
| 62-178718 | 7/1987 | Japan | H05K 1/03 |
| 2-275256 | 10/1990 | Japan | C08L 63/00 |
| 2-409745 | 12/1990 | Japan | C08L 63/00 |

OTHER PUBLICATIONS

"Vinyl Ethers: Versatile Monomers for Coatings Applications," W. J. Burlant, J. S. Plotkin, F. J. Vara, International Specialty Products, RadTech Asia '91, Osaka, Japan, Apr. 1991.

*Primary Examiner*—Paul R. Michl
*Assistant Examiner*—Mary Critharis
*Attorney, Agent, or Firm*—Donald F. Haas

[57] ABSTRACT

The invention herein relates to polyurethane coating and adhesive compositions containing partially unsaturated monohydroxylated polydiene polymers which are comprised of at least two polymerizable ethylenically unsaturated monomers wherein at least one is a diene monomer which yields unsaturation suitable for epoxidation. The invention preferably encompasses the use of epoxidized derivatives of these novel partially unsaturated monohydroxylated polydiene polymers and epoxidized derivatives of unsaturated monohydroxylated polydiene polymers in such mating and adhesive compositions. The preferred monohydroxylated polydiene polymer of the present invention has a structural formula:

$$(HO)_x\text{-}A\text{-}S_z\text{-}B\text{-}(OH)_y \qquad (I)$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. The A blocks have a molecular weight of from 100 to 6000, preferably 100 to 3,000, and most preferably 500 to 2000, and the B blocks have a molecular weight of from 1000 to 15,000, preferably 3000 to 7000, and most preferably 2000 to 6000. S is a vinyl aromatic hydrocarbon block which may have a molecular weight of from 500 to 10,000. x and y are 0 or 1 and either x or y must be 1 but only one at a time can be 1. z is 0 or 1. These polymers are preferably epoxidized such that they contain from 0.5 to 7.0 milliequivalents (meq) of epoxy per gram of polymer.

20 Claims, No Drawings

POLYURETHANE COATINGS AND ADHESIVES CONTAINING MONOHYDROXYLATED DIENE POLYMERS AND EPOXIDIZED DERIVATIVES THEREOF

BACKGROUND OF THE INVENTION

This invention relates to coating and adhesive compositions based upon novel monohydroxylated diene polymers. More specifically, the invention relates to polyurethane compositions containing monohydroxylated polydiene block copolymers or random copolymers of at least two different monomers, at least one of which is a diene.

Monohydroxylated polydienes are known. Most of these polymers are homopolymers of one diene or another. For example, monohydroxlated polybutadienes are known in the art for use in some kinds of coating formulations. U.S. Pat. No. 4,242,468 describes solventless polyurethane coatings having improved flexibility resulting from incorporation of monohydroxylated polybutadienes. Epoxidized versions of hydroxylated polybutadienes are known as well. Low viscosity epoxidized polydiene polymers are also known for use in coatings. Such polymers are described in commonly assigned U.S. Pat. Nos. 5,229,464 and 5,247,026.

The reaction of diisocyanate, or polyisocyanate curing agents with polyol resins, such as alkyd resins, polyester resins, epoxy resins or acrylic resins having hydroxyl groups, is widely used to make coatings and adhesives for substrates like metals, wood and plastics. In conventional coatings, high molecular weight components could be used in solvent solution that make coatings having a broad range of properties. However, solventless or low solvent coatings, which have been developed in response to environmental problems with solvents, must be formed from low molecular weight components which typically make hard coatings that have poor flexibility and poor adhesion to substrates.

The monohydroxylated polymers described above have certain disadvantages that make them unsuitable for use in polyurethane coatings. Their primary limitation is that they are too nonpolar and so do not give phase stable blends in the coating formulations. The key requirement appears to be that all of the components, the monohydroxylated polymer, the polyol resin, and the isocyanate curing agent, must be compatible.

SUMMARY OF THE INVENTION

This invention is a polyurethane coating or adhesive composition containing a vinyl aromatic hydrocarbon-containing monohydroxylated polydiene polymer which is comprised of at least two polymerizable ethylenically unsaturated monomers wherein at least one is a diene monomer which yields unsaturation suitable for epoxidation. The polymers used herein must contain at least about 15% by weight of a vinyl aromatic hydrocarbon. The monohydroxylated polymers are preferably block copolymers of at least two conjugated dienes, preferably isoprene and butadiene, and a vinyl aromatic hydrocarbon wherein a hydroxyl group is attached at one end of the polymer molecule. These polymers may be hydrogenated or unhydrogenated. It is preferred that these polymers be epoxidized for best performance in the coating and adhesive compositions of the present invention.

The preferred monohydroxylated polydiene polymer of the present invention has the structural formula:

$$(HO)_x\text{-}A\text{-}S_z\text{-}B\text{-}(OH)_y \qquad (I)$$

wherein A and B are polymer blocks which may be homopolymer blocks of conjugated diolefin monomers, copolymer block of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. Generally, it is preferred that the A blocks should have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks. The A blocks have a molecular weight of from 100 to 6000, preferably 500 to 4,000, and most preferably 1000 to 3000, and the B blocks have a molecular weight of from 1000 to 15,000, preferably 2000 to 10,000, and most preferably 3000 to 6000. S is a vinyl aromatic hydrocarbon block which may have a molecular weight of from 100 to 10,000. x and y are 0 or 1. Either x or y must be 1, but only one at a time can be 1. z is 0 or 1. Either the A or the B block may be capped with a miniblock of polymer, 50 to 1000 molecular weight, of a different composition, to compensate for any initiation, tapering due to unfavorable copolymerization rates, or capping difficulties. These polymers are preferably epoxidized such that they contain from 0.5 to 7.0 milliequivalents (meq) of epoxy per gram of polymer.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers may, of course, be random, tapered, block or a combination of these.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as a solid such as a crumb, a powder, a pellet or the like. When polymerized to low molecular weight, it may be recovered as a liquid such as in the present invention.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula: wherein R is an aliphatic, cycloaliphatic, aromatic or alkyl-substituted aromatic hydrocarbon radical having from 1 to about 20 carbon atoms.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The monohydroxylated polydienes are synthesized by anionic polymerization of conjugated diene hydrocarbon monomers with lithium initiators. This process is well known as described in U.S. Pat. Nos. 4,039,593 and Re. 27,145 which descriptions are incorporated herein by reference. Polymerization commences when a monolithium initiator polymerizes the monomers into a living polymer. Typical monolithium living polymer structures containing conjugated diene hydrocarbon monomers are:

X-A-B-Li

X-A-B-A-Li wherein B represents polymerized units of one conjugated diene hydrocarbon such as butadiene, A represents polymerized units of another conjugated diene such as isoprene, and either A or B may contain or be formed of one or more vinyl aromatic compounds such as styrene, and X is the residue of a monolithium initiator such as sec-butyllithium. The hydroxyl groups are added by capping the living polymer chain end with ethylene oxide and terminating with a proton donor such as an alcohol.

The most highly preferred monohydroxylated polymers for use herein are diblock polymers which fall within the scope of formula (I) above. The overall molecular weight of such diblocks may range from 1500 to 15000, preferably 3000 to 7000. Either of the blocks in the diblock may contain some randomly polymerized vinyl aromatic hydrocarbon as described above. For example, where I represents isoprene, B represents butadiene, S represents styrene, and a slash (/) represents a random copolymer block, the diblocks may have the following structures:

I-B/S-OH I/S-B-OH or B/I-B/S-OH B-B/S-OH I-EB/S-OH or I-S/EB-OH I/S-EB-OH HO-I-S/B HO-I-S/EB where EB is hydrogenated butadiene, -EB/S-OH means that the hydroxyl source is attached to a styrene mer, and -S/EB-OH signifies that the hydroxyl source is attached to a hydrogenated butadiene mer. This latter case, -S/EB-OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. It is preferred that the hydroxyl be attached to the butadiene block because the epoxidation proceeds more favorably with isoprene and there will be a separation between the functionalities on the polymer. However, the hydroxyl may also be attached to the isoprene block if desired. This produces a more surfactant-like molecule with less load bearing capacity. The isoprene blocks may also be hydrogenated.

Certain triblock copolymers are also preferred for use herein. Such triblocks usually include a styrene block or randomly copolymerized styrene to increase the polymers glass transition temperature, compatibility with polar materials, strength, and room temperature viscosity. These triblocks include the following specific structures:

I-EB/S-EB-OH I-B/S-B-OH I-S-EB-OH I-S-B-OH or I-I/ S-I-OH I-S-I-OH B-S-B-OH B-B/S-B-OH or I-B/S-I-OH I-EB/S-I-OH or I-B-S-OH I-EB-S-OH HO-I-EB-S

The latter group of polymers specified in the last line above wherein the styrene block is external are represented by the formula $$(HO)_x\text{-A-B-S-}(OH)_y \quad \text{(II)}$$

where A, B, S, x, and y are as described above. These polymers and the other triblocks shown above are particularly advantageous for introducing blocks of epoxy functionality into the monohydroxylated polymers at multiple sites.

The monohydroxylated polymers of this invention, when epoxidized, should have from 0.5 to 7.0 meq of epoxy per gram of polymer in order to ensure that the polymers will have good compatibility with other ingredients in the coating. It is preferred that the epoxy content be from 1.0 to 5.0 meq/g because when the epoxy content reaches about 1.0 meq/gm, the compatibility of the polymers is much improved and above about 5.0 meq/gm, polymer cost becomes quite high. The polymers must aim contain from 15 to 60% by weight of a vinyl aromatic hydrocarbon or else the compatibility of the mixture will be unacceptable. The hydroxyl group is the third element of these polymers that helps to make them compatible and suitable for the intended coatings applications. Coatings made with the polymers of this invention are more compatible and retain hardness to a higher degree than similar polymers such as epoxidized polybutadiene monols and epoxidized polydienes and even epoxidized monohydroxylated polydienes which do not contain the required amount of vinyl aromatic hydrocarbon.

Epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic arthydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be reddissolved in an inert solvent. These methods are described in more detail in U.S. Pat. No. 5,229,464 and 5,247,026 which are herein incorporated by reference.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/ number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

The monohydroxylated polymers are included in the coating or adhesive formulation in an amount sufficient to give the desired improvement in properties in the cured composition. Generally, this means that from 1 to 30% by weight of these polymers should be in the formulation. The coatings to be modified will be comprised of a polyol resin and a curing agent. The hydroxyl functional polyol can be an acrylic, an epoxy, a polyether or a polyester resin. The curing agent will be an isocyanate. The monohydroxylated polymers can be added to either the polyol component or to the isocyanate component of the coating. When the two components are mixed, the mixture is applied to the substrate, typically metal, wood or plastic, and the curing agent reacts with the polyol component giving the crosslinked coating or adhesive.

Typical hydroxyl functional acrylic resins are JONCRYL® 510 (from S.C. Johnson) and ACRYLOID® AU-608S (from Rohm & Haas). Typical hydroxyl functional epoxy resins are EPON®°1001 and EPON®1007 (from Shell). Typical hydroxyl functional polyether resins are PPG 1025 (from Arco) and POLY-G 20–28 (from Olin). Typical hydroxyl functional polyesters are TONE 0301 (from Union Carbide) and DESMOPHEN 670A-80 (from Miles).

The isocyanates used as curing agents are typically trifunctional isocyanates. Typical curing agents (from Miles) for ambient temperature curing are MONDUR® CB-60 (a reaction product of toluene diisocyanate and trimethylolpropane), DESMODUR®® Z-4370 from Miles (an isocyanurate of isophorone diisocyanate) or DESMODUR® N-3390, also from Miles (an isocyanurate of hexane diisocyanate). Isocyanates used for bake-cured coatings have their isocyanate groups blocked by reaction with a blocking agent, such as an alcohol, which will volatilize during baking. The polyol and curing agent are usually used at near the stoichiometric 1:1 hydroxyl:isocyanate ratio and the reaction rate is often enhanced by addition of DABCO® T-12 catalyst which is a dibutyl tin dilaurate (from Air Products).

The materials of the present invention are useful in adhesives (including contact adhesives, laminating adhesives, assembly adhesives and structural adhesives), coatings (such as topcoats for automotive, epoxy primers for metal, polyester coil coatings, alkyd maintenance coatings, etc.), films (such as those requiring heat and solvent resistance), and molded thermoset parts (for example reaction injection molded thermoset auto bumper, facie, etc.). However, it may be necessary for a formulator to combine a variety of ingredients together with the polymers of the present invention in order to obtain products having the proper combination of properties (such as adhesion, cohesion, durability, low cost, etc.) for particular applications. Thus, a suitable formulation might contain only the polymers of the present invention and the curing agent. However, in many applications, suitable formulations would also contain various combinations of resins, plasticizers, fillers, solvents, stabilizers and other ingredients. No definite rules can be offered about which ingredients will be used. The skilled formulator will choose particular types of ingredients and adjust their concentrations to give exactly the combination of properties needed in the composition for any specific application.

Coatings are frequently thin, non-sticky, pigmented compositions applied on a substrate to protect or decorate it. Therefore, hydrogenated epoxidized monohydroxylated polymers may be needed to give adequate durability. Fillers and pigment will be selected carefully to give appropriate durability and color. Coatings will frequently contain relatively high solvent concentration to allow easy application and give a smooth dry coating.

Adhesives are used to adhere two substrates together and sometimes to fill the gap between them. Fillers and pigment will be selected to reduce cost and to give appropriate durability and color. Since adhesives are sometimes applied in fairly thick layers, solvent content is as low as possible to minimize shrinkage and stress in the adhesive.

A formulator skilled in the art will see tremendous versatility in the polymers of this invention to prepare products having properties suitable for many different applications.

The coating and adhesive compositions of the present invention can be prepared by mixing the components together until a homogeneous blend is obtained. Various methods of blending are known to the art and any method that produces a homogenous blend is satisfactory. Frequently, the components can be blended together using solvent to control viscosity. Suitable solvents, which vary depending on the particular resin used, include common hydrocarbons, esters, ethers and ketones. Alcohol solvents are not used because they would react with the isocyanate curing agent. The solvents must be thoroughly dried to prevent introduction of moisture which would also react with the isocyanate curing agent.

EXAMPLES

Coatings made according to the present invention were evaluated for mechanical properties. The appearance (gloss) of the coatings was judged visually. The pencil hardness (gouge) of the coatings was measured according to the ASTM D3363 method of pushing successively softer pencil leads across the coating until the pencil lead will no longer gouge through the coating. The hardness scale (softest to hardest) is 6B<5B<4B<3B<2B<B<HB<F<H<2H<3H<4H<5H<6H. The methyl ethyl ketone (MEK) resistance of the coatings was measured according to the ASTM D4752 method of rubbing an MEK-moistened cloth across the coating for 200 cycles, or until breakthrough to the aluminum substrate occurred (one cycle equals one forward and one backward stroke). Adhesion of the coatings was measured with the cross hatch adhesion test, ASTM D3359, Method B. In this test, a lattice pattern is scribed through the coating, pressure sensitive tape is applied and removed, and the amount of coating removed with the tape is rated. The scale ranges from 5 (no adhesion loss) to 0 (greater than 65% adhesion loss).

The effectiveness of the monohydroxylated diene polymers in improving properties of coatings was tested in two acrylic urethane formulations using the acrylic polyol and two different triisocyanate curing agents. The hydroxyl (OH) equivalent weight of JONCRYL® 510 (80%w solids) is 500. The isocyanate (NCO) equivalent weight of DESMODUR® Z-4370 (70%w solids) and DESMODUR® Z-3390 (90%w solids) are 365 and 216, respectively. The acrylic polyol and the triisocyanate curing agents were mixed at 1.1 to 1 NCO to OH molar ratio, the DABCO T-12 catalyst was added, and coatings were applied onto steel panels.

Four different polymers, all having 6000 molecular weight, were compared in the following experiments. Polymer 1 was an epoxidized I-EB-OH (epoxy content 1.5 meq/gm). Polymer 2 was an epoxidized I-S/EB-OH (epoxy content 1.5 meq/gm) and Polymer 3 was its unepoxidized precursor (double bond content 1.7 meq/gm). Polymer 4 was an epoxidized I-S/EB-I (epoxy content 1.2 meq/gm). The polymers were dissolved at 70%w solids content in 2-heptanone which had been previously dried with mol sieves. The polymer solutions were mixed with the triisocyanates and catalyst for about 24 hours before the acrylic polyol was added and coatings were applied onto steel panels.

| Formulation<br>Component | 1<br>parts by weight (pbw) | 2<br>pbw |
|---|---|---|
| JONCRYL ® 510 | 500 | 500 |
| DESMODUR ® Z-4370 | 402 | — |
| DESMODUR ® N-3390 | — | 238 |
| Polymer | 170 | 154 |
| DABCO T-12 | 0.8 | 0.8 |
| 2-Heptanone | 166 | 193 |

The solutions were checked to see if they were phase stable and those which did not phase separate were drawn down onto steel panels (D36 CRS panels from Q-Panel Corp.) using a #22 wire wound rod. The coatings were tested after being held at room temperature for two weeks. The following result were obtained.

In formulation 1, the solution with Polymer 1 phase separated. All the other polymers gave phase stable solutions and so were cast as coatings, the properties of which are shown in the following table.

| | | Polymer | | |
|---|---|---|---|---|
| Properties | None | Polymer 2 | Polymer 3 | Polymer 4 |
| Thickness, mil | 0.7 | 0.8 | 0.7 | 0.7 |
| Pencil hardness | 2H | H | F | F |
| MEK rubs | 14 | 3 | 2 | 7 |
| Adhesion | 2 | 4 | 4 | 4 |
| Gloss | High | High | High | High |
| Tack | None | None | None | Tacky |

The fact that Polymer 1 phase separated shows that the polymer must have some styrene in order to gain compatibility with this acrylic/isocyanate system. Polymers 2 and 3, with and without epoxy, both influenced the properties of the acrylic urethane to about the same extent—both reduced the hardness and increased the adhesion. The results on Polymer 4 show that, although its styrene content was sufficient to give a phase stable solution, it made the cured coating tacky and therefore is unsuitable. Thus, the hydroxyl group on Polymers 2 and 3 is required to achieve satisfactory performance.

In formulation 2, the only polymer which gave a phase stable blend was Polymer 2. These results clearly show that, in this case, styrene is required in the polymer, the I block must be epoxidized, and the OH group is required. The coating properties for Polymer 2 in Formulation 2 are shown in the following table.

| | Polymer | |
|---|---|---|
| Properties | None | Polymer 2 |
| Thickness, mil | 0.6 | 0.8 |
| Pencil hardness | 2H | 2H |
| MEK rubs | 6 | 7 |
| Adhesion | 1 | 5 |
| Gloss | High | High |
| Tack | None | None |

These results show that Polymer 2 gives a dramatic improvement in adhesion with no apparent reduction in other properties.

I claim:
1. A polyurethane composition which is a phase stable blend comprising:
   (a) a hydroxyl-containing polyol resin,
   (b) an isocyanate curing agent, and
   (c) a monohydroxylated polydiene polymer which is comprised of at least two polymerizable ethylenically unsaturated hydrocarbon monomers wherein at least one is a diene monomer which yields unsaturation suitable for epoxidation, said polymer containing from 15 to 60% by weight of a vinyl aromatic hydrocarbon.
2. The composition of claim 1 wherein the monohydroxylated polydiene polymer contains from 0.5 to 7.0 meq of epoxy per gram of polymer.
3. The composition of claim 1 wherein the monohydroxylated polydiene polymer has the formula

$$(HO)_x\text{-A-S}_z\text{-B-(OH)}_y$$

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1, and z is 0 or 1.
4. The composition of claim 3 wherein the monohydroxylated polydiene polymer contains from 0.5 to 7.0 meq of epoxy per gram of polymer.
5. The composition of claim 1 wherein the monohydroxylated polydiene polymer has the formula $$(HO)_x\text{-A-B-S-(OH)}_y$$

wherein A and B are polymer block which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, x and y are 0 or 1 and either x or y must be 1 but only one at a time can be 1.
6. The composition of claim 5 wherein the monohydroxylated polydiene polymer contains from 0.5 to 7.0 meq of epoxy per gram of polymer.
7. A cured coating comprising the composition of claim 1.
8. A cured coating comprising the composition of claim 2.
9. A cured coating comprising the composition of claim 3.
10. A cured coating comprising the composition of claim 4.
11. A cured coating comprising the composition of claim 5.
12. A cured coating comprising the composition of claim 6.
13. A cured adhesive comprising the composition of claim 1.
14. A cured adhesive comprising the composition of claim 2.
15. A cured adhesive comprising the composition of claim 3.
16. A cured adhesive comprising the composition of claim 4.
17. A cured adhesive comprising the composition of claim 5.
18. A cured adhesive comprising the composition of claim 6.

19. The composition of claim 3 wherein the monohydroxylated polymer is a diblock polymer having a structure selected from the group consisting of I-B/S-OH, I/S-B-OH, B/I-B/S-OH, B-B/S-OH, I-EB/S-OH, I-S/EB-OH, I/S-EB-OH, OH-I-S/B, and OH-I-S/EB, and the molecular weight of the polymers ranges from 1500 to 15,000.

20. The composition of claim 19 wherein the monohydroxylated polydiene polymer contains from 0.5 to 7.0 meq of epoxy per gram of polymer.

* * * * *